US012626074B2

(12) United States Patent
Kormann

(10) Patent No.: US 12,626,074 B2
(45) Date of Patent: May 12, 2026

(54) MARKING AND READOUT METHODS TO BE CARRIED OUT BY MEANS OF A PROCESSING MACHINE, PROCESSING METHOD, PROCESSING MACHINE AND PRODUCTION LINE

(71) Applicant: GROB-WERKE Gmbh & Co. KG, Mindelheim (DE)

(72) Inventor: Benjamin Kormann, Mindelheim (DE)

(73) Assignee: GROB-WERKE Gmbh & Co. KG, Mindelheim (DE)

( * ) Notice: Subject to any disclaimer, the term of this patent is extended or adjusted under 35 U.S.C. 154(b) by 128 days.

(21) Appl. No.: 18/603,699

(22) Filed: Mar. 13, 2024

(65) Prior Publication Data

US 2024/0311587 A1 Sep. 19, 2024

(30) Foreign Application Priority Data

Mar. 16, 2023 (DE) .......................... 102023106632.3
Jun. 6, 2023 (EP) ..................................... 23177645

(51) Int. Cl.
*G06K 1/02* (2006.01)
*B23Q 15/24* (2006.01)
(Continued)

(52) U.S. Cl.
CPC ............. *G06K 1/025* (2013.01); *B23Q 15/24* (2013.01); *G06K 7/10* (2013.01); *B23Q 17/20* (2013.01)

(58) Field of Classification Search
CPC .......... G06K 1/025; G06K 7/10; B23Q 15/24
See application file for complete search history.

(56) References Cited

U.S. PATENT DOCUMENTS 4,794,736 A * 1/1989 Fuwa ................... G05B 19/402
451/6
4,854,551 A * 8/1989 Griebeler ............... B23Q 15/24
266/76
(Continued)

FOREIGN PATENT DOCUMENTS

CN 205970541 U 2/2017
DE 2834376 A1 3/1979
(Continued)

OTHER PUBLICATIONS

European Search Report for corresponding European Patent Application No. 23177645.1 dated Nov. 2, 2023.
(Continued)

*Primary Examiner* — Omar Flores Sanchez
(74) *Attorney, Agent, or Firm* — Greer, Burns & Crain, Ltd.

(57) ABSTRACT

To enable simple identification of a workpiece with little effort during machining of a workpiece on a processing machine, a marking method is provided which is to be carried out via the processing machine. The method includes a) providing a tool on a rotatable tool holder of the processing machine, b) relative linear movement of the tool holder and the workpiece along a line on the surface of the workpiece, and c) controlling the distance of tool holder and workpiece during the linear movement, so that a pattern of markings is produced along the line by machining with the tool to form the identification mark on the surface of the workpiece. Furthermore, a readout method, a machining method and a processing machine configured for carrying the method are provided.

13 Claims, 3 Drawing Sheets

(51) Int. Cl.
   *G06K 7/10* (2006.01)
   *B23Q 17/20* (2006.01)

(56) References Cited

U.S. PATENT DOCUMENTS

| | | | | | |
|---|---|---|---|---|---|
| 5,094,574 | A | * | 3/1992 | Nishigai | B23K 26/037 |
| | | | | | 409/218 |
| 5,161,922 | A | * | 11/1992 | Malloy | B23Q 15/24 |
| | | | | | 324/207.16 |
| 5,676,504 | A | | 10/1997 | Mueller et al. | |
| 5,751,435 | A | | 5/1998 | Bornhorst, Jr. et al. | |
| 10,489,697 | B2 | | 11/2019 | Imamura et al. | |
| 2011/0268521 | A1 | * | 11/2011 | Winckler | B23Q 39/023 |
| | | | | | 409/206 |
| 2014/0263667 | A1 | | 9/2014 | Mege | |
| 2018/0326499 | A1 | * | 11/2018 | Mcbride | B23Q 17/2233 |
| 2019/0084112 | A1 | * | 3/2019 | Kojima | B23Q 17/2275 |
| 2020/0016690 | A1 | | 1/2020 | Polk et al. | |
| 2021/0154791 | A1 | * | 5/2021 | Kojima | G05B 19/401 |

FOREIGN PATENT DOCUMENTS

| | | | |
|---|---|---|---|
| DE | 2929673 | A1 | 2/1981 |
| DE | 19800034 | C2 | 3/2001 |
| DE | 69431202 | T2 | 12/2002 |
| DE | 112016003020 | T5 | 3/2018 |
| DE | 102017107672 | B4 | 8/2020 |
| EP | 0779120 | B1 | 10/2002 |
| GB | 1201487 | A | 8/1970 |
| WO | 2013120076 | A1 | 8/2013 |
| WO | 2014113865 | A1 | 7/2014 |

OTHER PUBLICATIONS

Wikipedia, "Bearbeitungszentrum" retrieved from https://de.wikipedia. org/wiki/Bearbeitungszentrum on May 12, 2023; 2 pages.
Wikipedia, "Werkzeugmaschine" retrieved from https://de.wikipedia. org/wiki/Werkzeugmaschine on May 12, 2023; 11 pages.
Grob-Werke, "G-Module" retrieved from https://www.grobgroup. com/produkte/produktbereiche/zerspanumgstechnik/ bearbeitungszentrum/ on Feb. 19, 2024; 7 pages.

* cited by examiner

MARKING AND READOUT METHODS TO BE CARRIED OUT BY MEANS OF A PROCESSING MACHINE, PROCESSING METHOD, PROCESSING MACHINE AND PRODUCTION LINE

CROSS-REFERENCES TO RELATED APPLICATIONS

This application claims the benefit of the German Patent Application No. 102023106632.3, filed on Mar. 16, 2023, and of the European Patent Application No. 23177645.1 filed on Jun. 6, 2023, the entire disclosures of which are incorporated herein by way of reference.

FIELD OF THE INVENTION

The invention relates to a marking method for marking a workpiece which is to be carried out by means of a processing machine for machining. The invention also relates to a readout method to be carried out by means of a processing machine for machining for reading an identification mark which is obtainable or has been generated by such a marking method. The invention also relates to a tool processing method for machining workpieces by means of a processing machine while carrying out such a marking and/or readout method. The invention further relates to a processing machine which is designed to carry out one or more of the aforementioned processes. Furthermore, the invention relates to a production line comprising several of such processing machines. Finally, the invention relates to a computer program with instructions for carrying out one or more such processes.

BACKGROUND OF THE INVENTION

With regard to the technological background and prior art, reference is made, in particular, to the following literature:

[1] DE 29 29 673 A1
[2] Werkzeugmachine—Wikipedia; retrieved on May 12, 2023 at https://de.wikipedia.org/wiki/Werkzeug-maschine
[3] Bearbeitungszentrum—Wikipedia, retrieved on May 12, 2023 at https://de.wikipedia.org/wiki/Bearbeitung-szentrum
[4] WO2013/120076A1
[5] DE 11 2016 003 020 T5
[6] US 2020/016 690 A1
[7] CN 205970541 U
[8] WO 2014/113 865 A1
[9] US 2014/263 667 A1
[10] GB 1 201 487 A
[11] Website: https://www.grobgroup.com/produkte/produktbereiche/zerspanungstechnik/bearbe itungszen-tren/

The literature references [4] to [10] disclose different methods and devices for labeling or marking objects.

SUMMARY OF THE INVENTION

In references [1] to [3], various examples of numerically controlled processing machines for the machining of workpieces are known. Examples of processing machines for machining are, in particular, numerically controlled machine tools, see reference [2], for turning, milling and/or drilling. A particularly preferred form of machine tools in embodiments of the invention are machining centers, see references

[3] and [11]. It is known from reference [1] that numerically controlled machine tools (as defined in reference [2]) or similar machine tools, in particular machining centers (see reference [3]), can include probes to detect the progress and/or quality of machining by probing the workpiece.

Currently, in many production systems, each workpiece is marked individually as the first work step and identified in subsequent work sequences.

Common methods of marking are:
stickers
lasering
needle embossing
screw fixing an RFID tag after the first machining operation Common methods of readout:
scanners
cameras
RFID readers The following points are reasons for marking and identifying workpieces:

Identification of the Workpiece Type

In order to carry out the appropriate subsequent operations, it is advantageous to identify the workpiece type. A workpiece that was processed as type A in the first operation should also be processed as type A in the next operation.

Assignment of Workpieces to Batches

If a problem is detected in a particular batch, the corresponding workpieces can be blocked and sorted out. For example, all workpieces that were processed on a specific machine on a specific day could be sorted out because a problem was detected with this machine during this period.

Evaluation of Meta Data

With the aid of workpiece identification, data such as the duration of a particular operation, throughput times, errors that have occurred, etc., can be determined. This allows post-calculations, error analysis, etc. to be carried out automatically.

The disadvantage of existing workpiece marking and identification techniques is that special devices or additional hardware (laser, needle embossers, scanners, cameras, RFID readers) or consumables (stickers, RFID tags) are required for both marking and identification.

There is also a risk of confusion when using hand-held scanners manually. The operator may want to scan workpiece A, but place workpiece B in the machine.

It is an object of the invention to simplify the identification of workpieces in the course of machining.

SUMMARY OF THE INVENTION

According to a first aspect of the invention, the invention provides a marking method for marking a workpiece to be carried out by means of a processing machine for machining, comprising:
   a) providing a tool for machining on a rotatable tool holder of the processing machine,
   b) relative linear movement of the rotating tool holder and the workpiece along a line on the surface of the workpiece,
   c) controlling the distance of tool holder and workpiece during the linear movement so that the tool selectively assumes a processing position for machining the workpiece and a release position in which the tool does not grip the workpiece during the linear movement, such that a pattern of markings for forming the identification mark on the surface of the workpiece is produced along the line by machining with the tool.

Preferably, step a) comprises the step:

a1) selecting the tool from a group of tools comprising a cutting tool, a milling cutter, a single-edged tool, a multi-edged tool, a ball cutter, a single-edged ball cutter, a beveled cutter and combinations of the aforementioned tools.

Preferably, step a) comprises the step:

a2) providing the tool on a spindle of the processing machine.

Preferably, step b) comprises the step:

b1) substantially uniform linear relative movement of the tool holder and the workpiece.

"Substantially" here means that, by and large, a uniform linear movement takes place at an approximately constant speed. However, minor adjustments of the speed are possible. In some embodiments, there is a uniform linear movement at a constant relative movement speed. As will be explained in more detail below, in some other embodiments there is a slight change in the axis speed, for example when the tool "lifts off" from the workpiece at the end of the inscription of a single marking due to the greater distance, e.g., if the tool, such as a milling cutter in particular, continues to rotate and constant marking distances are to be achieved. The "uniform linear movement" should therefore not be interpreted too literally and hence too restrictively. Compared to the known marking processes, in which engraving tools have to be moved towards and away from the surface and thus require large strokes and a large reversal of movement (which then entails a long processing time), the changes in speed are very small here.

In particular, movements in which the instantaneous speed deviates by up to 15% around an average speed or target speed are covered by the term "substantially uniform movement".

Preferably, step b) comprises the step:

b2) controlling the speed of the relative movement to produce a predetermined form of the markings.

Preferably, step b) comprises the step of:

b3) moving the workpiece and/or moving the tool holder.

b4) rotating the tool holder at a substantially constant speed.

Also, in the embodiments comprising step b4), the rotational speed remains the same in some embodiments and approximately the same in some other embodiments compared to conventional marking methods, although minor adjustments are possible. There may also be slight variations in spindle speed in embodiments that include step b4). As noted above, in some embodiments there is a slight change in the axis speed during "lift-off" in order to ensure the same marking distances while the tool (in particular, the milling cutter) continues to rotate constantly. If necessary, however, the control system changes both the rotational speed and the axis speed in order to achieve this goal. The "constant speed" must therefore not be interpreted too literally and hence too restrictively.

In particular, rotations in which the current rotational speed deviates by up to 15% around an average rotational speed are covered by the term "substantially constant rotational speed".

Preferably, step c) comprises the step:

c1) cyclically engaging and releasing the tool and workpiece to remove a piece of material from the surface of the workpiece at predetermined locations to create a mark.

Preferably, step c) comprises the step:

c2) lifting the tool from the surface of the workpiece to skip points.

Preferably, step c) comprises the step:

c3) varying the distance of tool holder and workpiece to influence a size of the marks and/or to generate a grayscale marking.

Preferably, step c) comprises the step:

c4) introducing one or more lines or indentations as markings into the workpiece, the arrangement and/or dimension of which contain readable data or information of the identification mark.

Preferably, step c) comprises the step:

c5) generating round markings.

Preferably, step c) comprises the step:

c6) generating markings in the form of parallelograms.

Preferably, step c) comprises the step:

c7) generating rectangular or square markings.

In some embodiments, a purely linear identification mark is generated, for example, from an arrangement of markings with different distances and/or lengths, comparable to a Morse code or a barcode. In some embodiments, steps b) and c) are repeated on spaced lines to create a two-dimensional pattern of markings to create the identification mark. Thus, a kind of matrix code can also be generated.

According to a further aspect, the invention relates to a readout method to be carried out by means of a processing machine for machining for reading an identification mark which is obtainable or has been generated by a marking method according to one of the preceding embodiments, comprising:

d) contacting a surface of a workpiece provided with the identification mark by means of a touch probe of the processing machine;

e) relative linear movement of the touch probe contacting the surface and the workpiece along a line of markings of the identification mark, f) detecting deflections of the touch probe depending on the position in order to read out the identification mark.

Preferably, the readout method comprises the step of:

Scanning the surface of the workpiece containing the marking by means of the touch probe.

Different touch probes can be used. In some embodiments, a scanning touch probe is used for reading. In the methods according to embodiments of the invention, a special feature is that indexing touch probes can also be used. Preferably, the readout method therefore comprises the step of:

Using an indexing touch probe.

Preferably, the touch probe is moved in a preferably uniform linear movement over the surface of the workpiece provided with an identification mark. Preferably, the same line is scanned in the readout method as in the marking method.

According to a further aspect, the invention provides a tool processing method for machining workpieces by means of a processing machine, comprising:

g) performing a marking process according to one of the preceding embodiments for providing the workpiece with an identification mark;

h) identifying the workpiece by reading the identification
    mark, in particular by means of a readout method
    according to one of the preceding embodiments;

i) performing processing of the workpiece depending on
    the identification carried out in step h).

It is preferred that step g) is carried out during the
execution of a first machining step for machining the work-
piece and that steps h) and i) are carried out during the
execution of a second machining step to be carried out
depending on the first machining step and/or depending on
the type of workpiece. In a production line, for example, the
marking method can be performed on a first processing
machine which performs a first processing step, while a
second processing machine which is passed after the first
processing machine in the production flow first performs the
readout method in order to identify the workpiece, in par-
ticular, to know, for instance, from this identification that the
first processing step has been performed, and then performs
a second processing step depending on the identification.

According to a further aspect, the invention provides a
processing machine for machining workpieces, the process-
ing machine comprising a processing device with at least
one tool provided on a tool holder for machining, a tool
holder drive unit for driving the tool holder, a relative
movement unit for relative movement of the tool holder and
workpiece, a measuring device for detecting the position of
a surface area of the workpiece, and a controller, wherein the
processing machine is designed to perform a method accord-
ing to one of the preceding embodiments. In particular, the
tool holder is provided on a rotatably driven spindle.

It is preferred that the control system is configured to
control the processing machine for carrying out the marking,
readout and/or processing method according to one of the
preceding embodiments.

According to a further aspect, the invention relates to a
production line or manufacturing plant comprising several
processing machines according to one of the preceding
embodiments.

According to a further aspect, the invention provides a
computer program comprising machine-readable instruc-
tions which cause a processing machine according to one of
the preceding embodiments or a production line provided
therewith to perform the marking, reading and/or processing
method according to one of the preceding embodiments.

Advantageous embodiments of the invention are used, in
particular, in metal-cutting machines and machine tools. For
more details and further features of preferably used process-
ing machines, reference is made to the following link:

https://www.grobgroup.com/produkte/produktbereiche/
        zerspanungstechnik/bearbeitungszentren/.

With preferred embodiments of the present invention, the
workpiece can be marked directly by the machine using a
milling tool or can be identified using the measuring probe.
This means that no additional hardware (laser, scanner) or
consumables (stickers, RFID tags) are required. Further-
more, mix-ups can no longer occur because the marking and
identification take place directly in the machine without
operator influence.

Preferred embodiments of the invention relate to machine
tools and their functioning. In an advantageous manner,
workpieces are marked using on-board means of the
machine tool without additional hardware. It is also prefer-
able to use on-board means to read out identification marks
produced in this way. The marking can be carried out during
processing and used for identification purposes during pro-
cessing.

BRIEF DESCRIPTION OF THE DRAWINGS

An embodiment is explained in more detail below with
reference to the attached drawings.

DETAILED DESCRIPTION OF THE PREFERRED EMBODIMENTS

Figure 1:
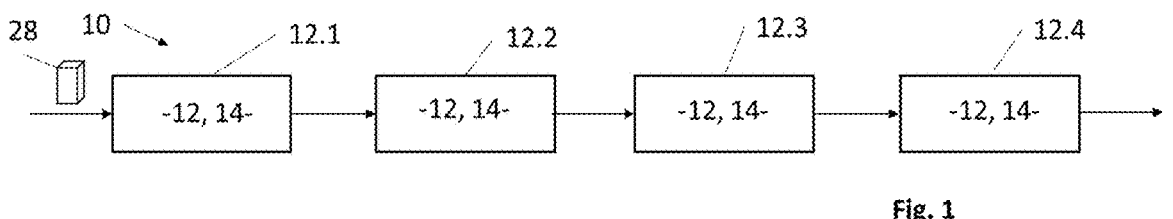
FIG. 1 shows a schematic block diagram of a production
line with several processing machines designed as machine
tools, in particular machining centers, for machining.

FIG. 1 shows a production line 10 for manufacturing a
product by machining a tool using several processing
machines 12. For example, an engine part or other part of a
complex product is manufactured by different processing
steps that are carried out successively on a series of machin-
ing centers 14, which are examples of embodiments of the
processing machines 12. Instead of machining centers 14,
machine tools other than processing machines 12 may be
used. For example, a workpiece 28, from which the product
is manufactured by machining, such as milling, turning
and/or drilling, passes successively through a first to fourth
processing machine 12.1-12.4 of the production line 10.

Figure 2:
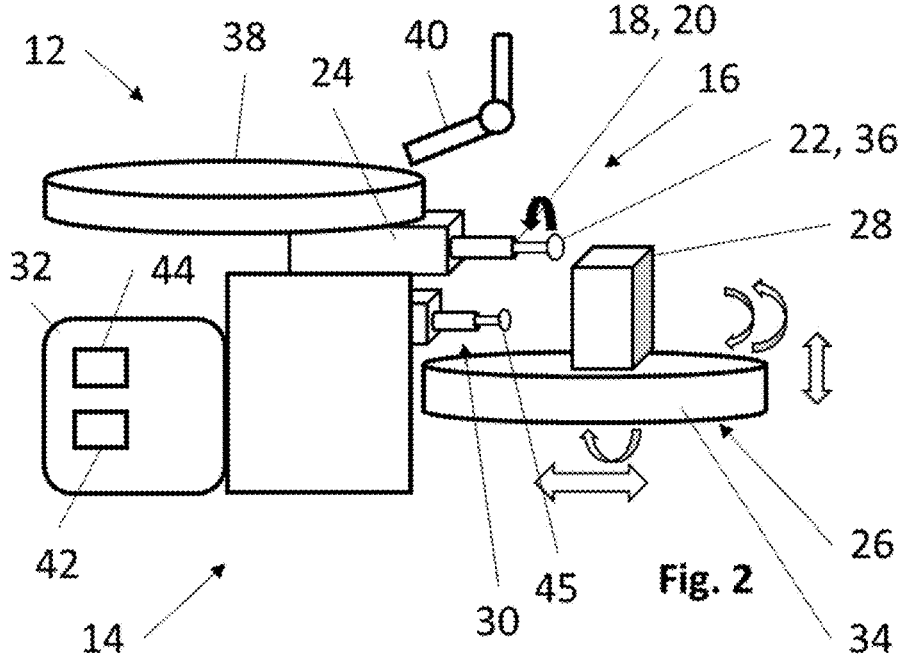
FIG. 2 shows a schematic block diagram of an embodi-
ment of one of the processing machines of the production
line.

An example of a processing machine 12, 12.1-12.4
designed here as a processing center 14 is shown in FIG. 2.
As is well known for machining centers 14, for example, but
also for other machine tools, see references [1] to [3] and
[11], the processing machine 12 includes a processing
device 16 with at least one tool 22 provided on a tool holder
18—in particular spindle 20—for machining, a tool holder
drive unit 24 for driving the tool holder 18, a relative
movement unit 26 for the relative movement of tool holder
18 and workpiece 28, a measuring device 30 for detecting
the position of a surface area of the workpiece 28 and a
controller 32. The measuring device 30 can be a touch probe
45 interchangeable in the tool holder 18.

In the illustrated embodiment, the workpiece 28 is
mounted on a workpiece table 34 which can move in several
directions and with which the workpiece 28 can be moved
past the tool 22—in particular milling cutter 36—rotatably mounted on the spindle 20 in order to perform the machining operation. The processing device 16 can thus remain stationary. In other embodiments, the processing device 16 can be designed to be movable and the tool table 34 can remain stationary or also be designed to be movable; this is also well known for such processing machines 12. By means of the relative movement unit 26, the tool 22 and the workpiece can thus be moved relative to one another, and it is irrelevant whether the tool 22 or the workpiece 28 or both are moved.

The processing machine 12 shown also has a tool magazine 38 and a tool changing device 40. This enables the desired tool 22 to be interchanged automatically. This is also well known in machining centers 14 and is therefore not described in detail.

The processing machine 12 is controlled by the controller 32 having a processor 42 (i.e., computer) and a memory 44 into which a computer program with control instructions is loaded. The controller 32 can be part of an overall control system for the production line 10 or an individual control unit which is assigned to the respective processing machine 12 and is controlled by the overall control system. The processes described in more detail below can also be carried out on an individual processing machine 12 that is not part of a production line 10.

In particular, a computer program is stored in the memory 44 of the controller 32 with instructions that cause the processing machine 12 to perform a marking method, a readout method and/or a workpiece processing method, as explained below with reference to preferred embodiments.

With preferred embodiments of the methods, the workpiece 28 can be marked directly by the processing machine 12 with a milling tool—milling cutter 36—or can be identified with a touch probe 45 of the measuring device 30. This means that no additional hardware (laser, scanner) or consumables (stickers, RFID tags) are required. Furthermore, mix-ups can no longer occur because the marking and identification take place directly in the processing machine 12 without operator influence.

FIGS. 3 to 7 show the workpiece 28 and the tool 22 during the marking process according to different embodiments. The marking process to be carried out by means of the processing machine 12 serves to mark the workpiece 28 and comprises the steps:

a) providing the tool 22 for machining on the rotatable tool holder 18 of the processing machine 12, b) relative linear movement of the rotating tool holder 18 and the workpiece 28 along a line on the surface of the workpiece 28, c) controlling the distance of tool holder 18 and workpiece 28 during the linear movement so that the tool 22 selectively assumes a processing position for machining the workpiece 28 and a release position in which the tool 22 does not grip the workpiece 28, during the linear movement, such that a pattern of markings 46 for forming the identification mark on the surface of the workpiece 28 is produced along the line by machining with the tool 22.

Figure 3:
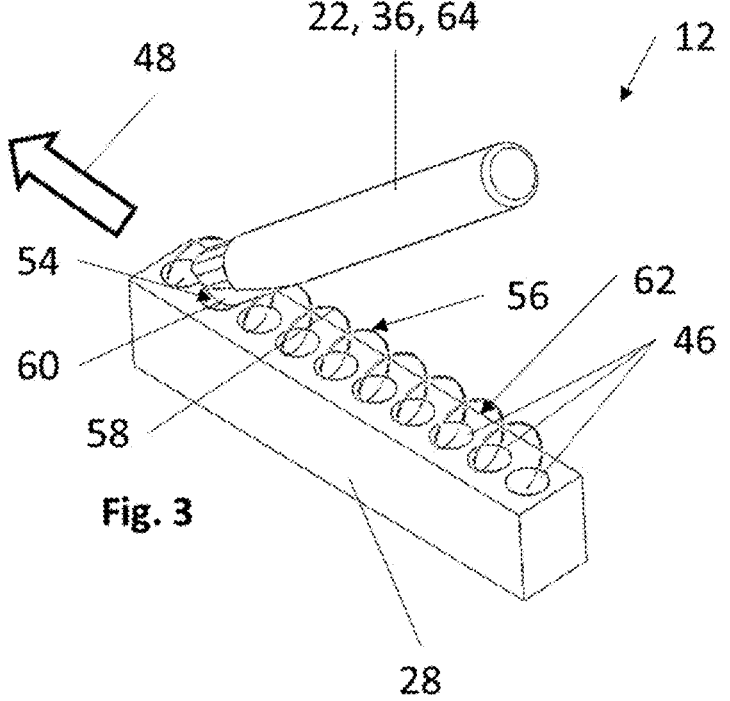
FIG. 3 shows a perspective schematic representation of a
tool of the processing machine and a surface area of a
workpiece during a marking process according to a first
embodiment, in which a marking is inscribed in the surface
of the workpiece in the course of processing the workpiece
and in which a curve indicating the movement of a cutting
edge of the tool is plotted in addition.
Figure 4:
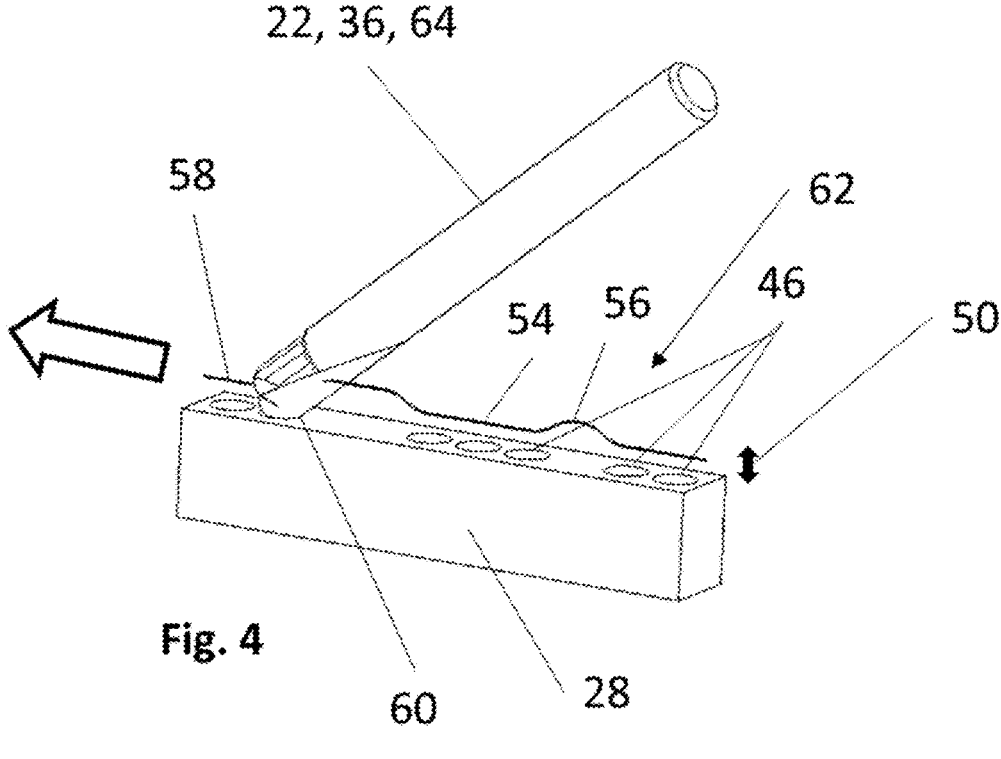
FIG. 4 shows a further perspective view of the region of
the workpiece to be provided with the identification mark
along with the tool and another curve showing the relative
raising and lowering of the tool and the workpiece.
Figure 5:
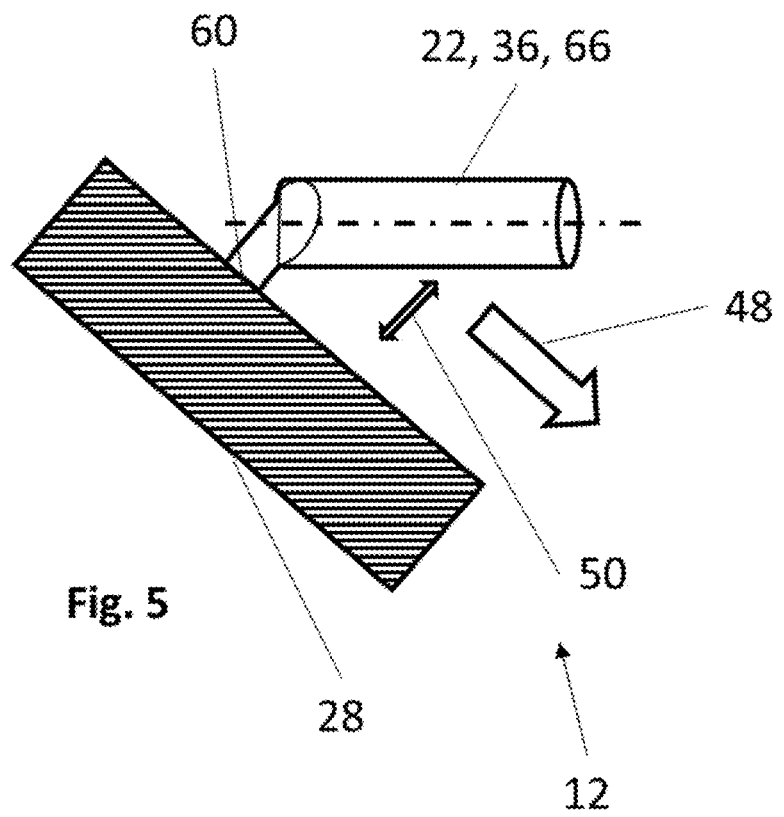
FIG. 5 shows a schematic partly sectional, partly perspec-
tive view of a tool of the processing machine in engagement
with the workpiece when carrying out the marking process
according to a second embodiment.
Figures 6, 7:
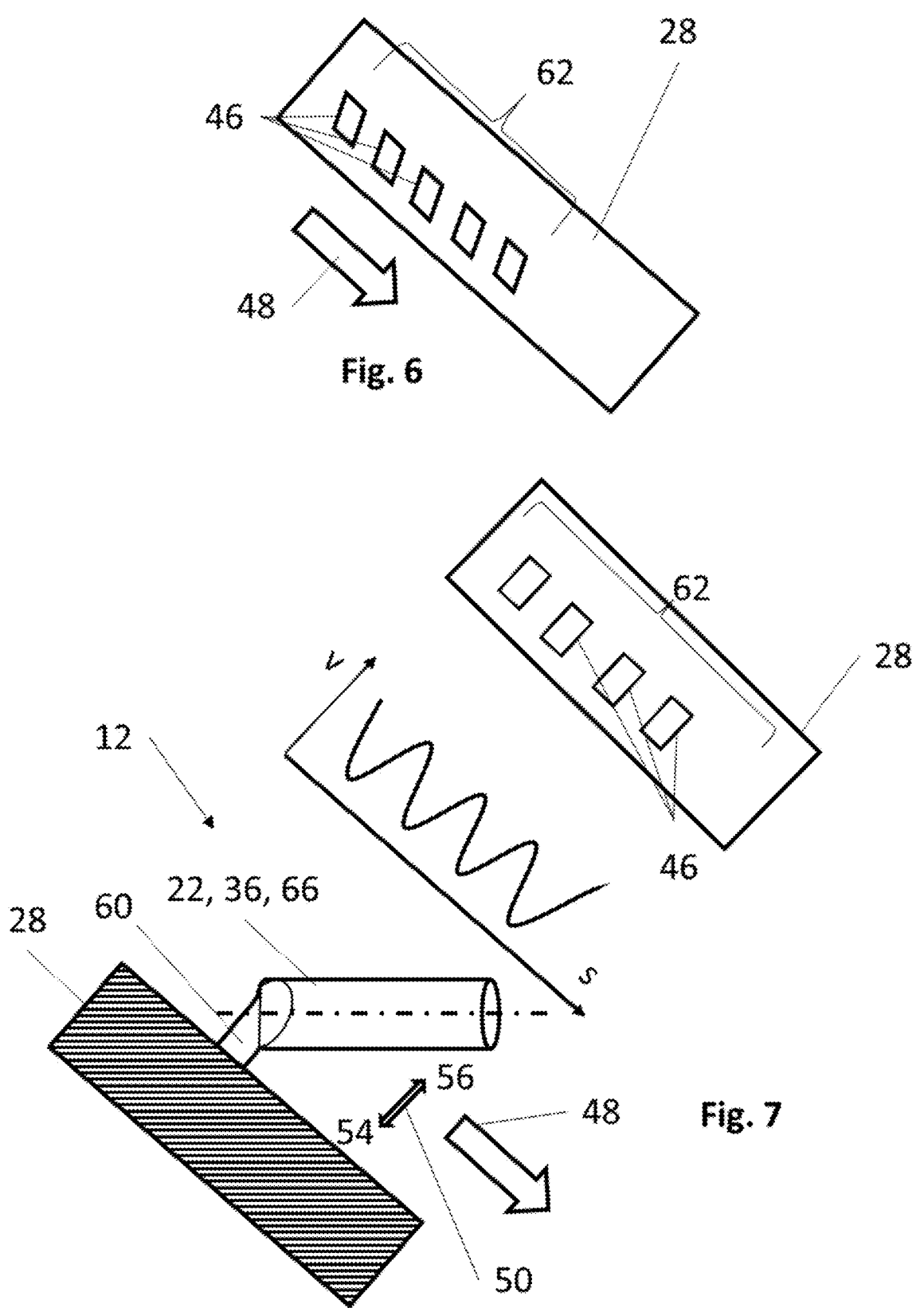
FIG. 6 shows a plan view of the surface of the workpiece
with an identification mark inscribed in accordance with the
second embodiment of the marking method.
FIG. 7 shows a combined schematic representation of the
tool engaging at the workpiece as in FIG. 5 in a marking
method according to a third embodiment together with the
plan view of the surface with the identification mark thus
obtained and a velocity profile showing a feed rate of the
tool over the surface as a function of position.

In FIGS. 3 and 5 and 7, the movement direction 48 of the linear movement is indicated by a thick arrow, while a small arrow 50 in FIGS. 5 and 7 and a movement curve 52 in FIG. 4 illustrate the relative raising and lowering for moving the tool 22 between the machining position 54 and the release position 56. In FIG. 3, the movement curve 58 of a cutting edge 60 of the milling cutter 36 is also indicated.

In particular, a cutting tool, a milling cutter 36, a single-edged tool, a multi-edged tool, a ball cutter, a single-edged ball cutter 64, a beveled cutter 66 or a combination tool with several functions of the aforementioned tools can be selected as the tool 22 for marking.

Preferably, the milling cutter 36 in the form of a single-edged ball cutter 64 with only one cutting edge 60 is used as the tool 22. A first embodiment of the marking process using a single-edged ball cutter 64 is shown in FIGS. 3 and 4, where round markings 46 are produced with the ball cutter 64. FIG. 3 shows a sequence of markings 46, which are produced when the ball cutter 64 is rotated and the tool holder 18 and workpiece 28 are moved relative to each other at a constant distance.

FIG. 4 shows the movement of the tool tip when certain markings 46 are omitted. For this purpose, the distance of workpiece 28 and tool 22 is adjusted from the engagement position 54, where markings 46 are produced, to the release position 56, where markings 46 are omitted, and vice versa.

At the line 48, along which the tool 22 is moved relative to the workpiece 28 over its surface, a line pattern of markings 46, similar to a bar code, is thus produced as an identification mark 62.

It would also be possible to generate a matrix code such as a QR code or DMC code by repeating the movement on parallel adjacent lines.

In the embodiments of the marking process shown in FIGS. 5 to 7, a beveled cutter 66 is used to produce parallelogram-shaped or rectangular markings 46.

FIGS. 3 and 5 show the movement of the tool 22 and the cutting edge 60 in rectilinear motion. In the embodiments shown in FIGS. 3 to 6, the tool 22 is moved uniformly linearly relative to the workpiece 28. When using the ball cutter 64, a sequence of round markings 46 is produced as shown in FIGS. 3 and 4. In the embodiment with the beveled cutter 66, parallelogram-shaped markings 46 are produced as shown in FIG. 6.

However, it is also possible to control the speed of the relative movement in order to produce a predetermined shape of the markings 46. In order to produce rectangular markings 46, for example, the speed of movement is reduced at the moment at which the marking 46 is produced and is increased again between the markings 46, as shown in FIG. 7. In this way, rectangular or square markings 46 can be produced, for example.

By means of the processing machine 12, 12.1-12.4, a readout method for reading the identification mark 62 can then also be performed. The readout process comprises the steps:

d) contacting the surface of the workpiece 28 provided with the identification mark 62 by means of the touch probe 45 of the measuring device 30 of the processing machine 12;

e) relative linear movement of the touch probe 45 contacting the surface and the workpiece 28 along the line of markings 46 of the identification mark 62, f) detecting deflections of the touch probe 45 depending on the position in order to read the identification mark 62.

In particular, the surface of the workpiece 28 including the markings 46 is scanned by the touch probe 45. An indexing touch probe can be used as the measuring probe 45.

Preferred applications and designs as well as variants of embodiments are explained in more detail below.

Application Example

In the manufacture of workpieces 28 such as pump impellers or other series products, a large quantity of workpieces 28 is often processed in a processing machine 12, 12.1-12.4 using a specific program (for performing predetermined machining operations). If these are processed here using the wrong program, all workpieces 28 may eventually be rejected because, for example, they were planned as type A and were processed using type A in the first operation (e.g., on the first processing machine 12.1), but the subsequent operation was performed using type B (e.g., on one or more of the second to fourth processing machines 12.2-12.4).

If the workpieces 28 had been marked in the first operation and the processing machine 12, 12.1-12.4 were able to identify the workpieces 28 and thus the type, the processing machine would not even start processing.

Some embodiments thus provide for a tool processing method for machining workpieces 28, in particular in one of the processing machines 12, 12.1-12.4 or in the production line 10 having the multiple processing machines 12, 12.1-12.4, which method comprises:

g) performing the marking process to provide the workpiece 28 with an identification mark 62;

h) identifying the workpiece 28 by reading the identification mark 62, in particular using the aforementioned reading method; and i) performing a machining operation on the workpiece 28 depending on the identification performed in step d).

In some embodiments, step g) is performed while performing a first processing step for machining the workpiece, and steps h) and i) are performed while performing a second processing step to be performed depending on the first processing step and/or depending on the type of the workpiece 28. For example, the marking process is performed on the first processing machine 12.1 of the production line 12, and another processing machine 12.2 of the production line which receives the workpiece 28 thereafter, reads the identification mark 62 and knows from the identification mark which processing has already been performed on the workpiece 28. For example, each subsequent processing machine 12.2-12.4 may add further markings 46 to the identification marks 62 by performing the marking process correspondingly to identify the workpiece 28 as a workpiece on which the processing step to be performed on the respective processing machine 12.2-12.4 has been performed.

Preferably, several markings 46, in particular in the form of recesses or indentations, are provided, which together form the identification mark 62. In preferred embodiments, the markings 46 of an identification mark 62 are on a line, so that they can be read out by a linear movement of a touch probe 45.

In principle, it would also be possible to read or write a matrix code by approaching each point individually and probing or drilling it. The larger the number of points becomes (some known matrix code technologies provide for more than 100 points, for example), the longer the required time, so that inscribing by a relatively continuous movement of the tool 22, which does not reverse at each marking, is more advantageous.

In some embodiments, marking is performed with the single-edged ball cutter 64. This cutting edge 60 is cyclically engaged by means of a rotating axis (usually the spindle 20) and cuts a piece of material from the surface. This cut-out piece thus forms the marking 46. In conjunction with at least one further axis, many markings 46 can be produced very quickly along a line.

No oscillating movement is required for marking; instead, tool 22 and workpiece 28 are moved in a relatively straight line. The processing machine 12 only has to deviate from the linear movement and lift off minimally to skip points.

During identification, a touch probe, e.g., an indexing probe (touch probe 45), is moved over the surface in such a way that it detects the presence or absence of points. For example, a touch probe is deflected at locations where no point is marked and is not deflected at locations where a point is marked. This allows the code to be read in one continuous movement.

Examples for the Cutting Tool

If round markings are desired, a single-edged ball cutter 64 is suitable. This produces almost round markings 46, as shown in FIGS. 3 and 4.

Number of Cutting Edges 60

With multi-edged tools 22, the markings 46 increasingly become oblique strokes. This may be desirable in certain cases in order to produce two different markings.

For example, a slash (/) inclined to the right can be created in the forward stroke and a slash (\) inclined to the left can be created in the return stroke.

Form of the Cutting Tool

The form of the marking 46 can be adapted by the form of the cutting tool. The easiest way to create round markings 46 is with a spherical cutter 64. If a beveled cutter 66 is used, parallelogram-shaped markings can be produced, see FIGS. 5 and 6.

In order to produce rectangular markings 46, for example, the movement speed is reduced at the moment when the marking 46 is produced and is increased again between the markings, see the velocity profile in FIG. 7, where the relative movement speed v of the tool 22 is plotted over the position s.

It is also conceivable to change the rotational speed in order to shape the markings 46.

In order to enable simple identification of the workpiece (28) with little effort during machining of a workpiece (28) on a processing machine (12, 12.1-12.4), a marking method to be carried out by means of the processing machine (12, 12.1-12.4) has been described, which comprises the following steps:

a) providing a tool (22) on a rotatable tool holder (18) of the processing machine (12, 12.1-12.4), b) relative linear movement of the rotating tool holder (18) and the workpiece (28) along a line (48) on the surface of the workpiece (28), c) controlling the distance of tool holder (18) and workpiece (28) during the linear movement so that a pattern of markings (46) is produced along the line (48) by machining with the tool (22) to form the identification mark (62) on the surface of the workpiece (28). Further, a readout method, a processing method and a processing machine (12) configured for carrying out the method have been described.

The systems and devices described herein may include a controller, such as controller 32, control unit, control device, controlling means, system control, processor, such as processor 42, computing unit or a computing device comprising a processing unit and a memory, such as memory 44, which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

| List of reference signs: | |
| --- | --- |
| 10 | production line |
| 12 | processing machine |
| 12.1 | first processing machine |
| 12.2 | second processing machine |
| 12.3 | third processing machine |
| 12.4 | fourth processing machine |
| 14 | processing center |
| 16 | processing device |
| 18 | tool holder |
| 20 | spindle |
| 22 | tool |
| 24 | tool holder drive unit (e.g., spindle drive) |
| 26 | relative movement unit |
| 28 | workpiece |
| 30 | measuring direction |
| 32 | controller |
| 34 | workpiece table |
| 36 | milling cutter |
| 38 | tool magazine |
| 40 | tool changing device |
| 42 | processor |
| 44 | memory |
| 45 | touch probe |
| 46 | marking |
| 48 | movement direction |
| 50 | lifting/lowering |
| 52 | movement curve of the tool (relative to the workpiece) |
| 54 | processing position |
| 56 | release position |
| 58 | movement curve of cutting edge |
| 60 | cutting edge |
| 62 | identification mark |
| 64 | ball cutter |
| 66 | ball cutter |

The invention claimed is:

1. A marking method to be performed by a processing machine for machining for marking a workpiece, the method comprising:

a) providing a tool for machining on a rotatable tool holder of the processing machine, b) relatively linearly moving the rotating tool holder and the workpiece along a line on a surface of the workpiece, and c) controlling a distance of tool holder and workpiece during the linear movement so that the tool selectively assumes a processing position for machining the workpiece and a release position, in which the tool does not grip the workpiece, during the linear movement such that no oscillating movement is performed for marking, but rather the tool and the workpiece are moved relatively in a straight line, and only for omitting certain markings, a distance between the workpiece and the tool is adjusted from the engagement position, where markings are produced, to the release position, where markings are omitted, so that a pattern of markings with different spacings, or lengths or both, is produced along the line by machining with the tool to form a linear identification mark on the surface of the workpiece.

2. The marking method according to claim 1, wherein step a) comprises one or more of the steps:

a1) selecting the tool from a group of tools comprising a cutting tool, a milling cutter, a single-edged tool, a multi-edged tool, a ball cutter, a single-edged ball cutter, a beveled milling cutter and combinations of the aforementioned tools, or a2) providing the tool on a spindle of the processing machine.

3. The marking method according to claim 1, wherein step b) comprises at least one or more of the following steps:

b1) substantially uniform linear relative moving of the rotatable tool holder and the workpiece;

b2) controlling a speed of the relative movement to produce a predetermined form of the markings;

b3) moving at least one of the workpiece or moving the rotatable tool holder; or b4) rotating the tool holder at a substantially constant speed.

4. The marking method according to claim 1, wherein step c) comprises at least one or more of the following steps:

c1) cyclically engaging and releasing the tool and the workpiece to remove a piece of material from the surface of the workpiece at predetermined locations to create a marking;

c2) lifting the tool from the surface of the workpiece to skip points;

c3) varying a distance of tool holder and workpiece at least one of to influence a size of the markings or to produce a grayscale marking;

c4) introducing one or more dots, lines or indentations as markings into the workpiece, at least one of an arrangement or dimension of the workpiece containing readable data or information of the identification mark;

c5) generating round markings;

c6) generating parallelogram-shaped markings; or c7) generating rectangular or square markings.

5. The marking method according to claim 1, wherein steps b) and c) are repeated at spaced lines to produce a two-dimensional pattern of markings to create the identification mark.

6. A read-out method to be performed by processing machine for machining for reading an identification mark which is obtainable or has been generated by a marking method according to claim 1, comprising:

d) contacting a surface of a workpiece provided with the identification mark via a touch probe of the processing machine;

e) relative linear movement of the touch probe contacting the surface and the workpiece along a line of markings of the identification mark, and f) detecting deflections of the touch probe depending on a position in order to read out the identification mark.

7. The read-out method according to claim 6, comprising at least one or more of the steps:

scanning the surface of the workpiece containing the marking with the touch probe; or using an indexing probe.

8. A tool processing method for machining workpieces with a processing machine, comprising:

g) performing a marking method according to claim 1 to provide the workpiece with an identification mark;

h) identifying the workpiece by reading out the identification mark, via a readout method comprising:

d) contacting a surface of a workpiece provided with the identification mark via a touch probe of the processing machine;

e) relative linear movement of the touch probe contacting the surface and the workpiece along a line of markings of the identification mark, and f) detecting deflections of the touch probe depending on a position in order to read out the identification mark; and, i) carrying out processing of the workpiece as a function of the identification carried out in step h).

9. The tool processing method according to claim 8, wherein step g) is carried out during an execution of a first processing step for machining the workpiece, and wherein steps h) and i) are carried out during an execution of a second processing step to be carried out at least one of as a function of the first processing step or as a function of the type of workpiece.

10. A processing machine for machining workpieces, comprising:

a machining device with at least one tool provided on a tool holder for machining, a tool holder drive unit for driving the tool holder, a relative movement unit configured to relatively move the tool holder and the workpiece, a measuring device configured to detect a position of a surface region of the workpiece and a controller, wherein the processing machine is configured to carry out a method according to claim 1.

11. The processing machine according to claim 10, wherein the controller is configured to control the processing machine for carrying out the method.

12. A production line comprising a plurality of processing machines according to claim 10.

13. A computer program comprising machine-readable instructions which cause a processing machine for machining workpieces, comprising a machining device with at least one tool provided on a tool holder for machining, a tool holder drive unit for driving the tool holder, a relative movement unit configured to relatively move the tool holder and the workpiece, and a measuring device configured to detect the position of a surface region of the workpiece, and a controller, to perform the method according to claim 1.

* * * * *